United States Patent [19]

Volpp et al.

[11] 3,723,448

[45] Mar. 27, 1973

[54] N-(4-CYANO-1,2,3-THIADIZOL-5-YL)PROPIONAMIDE

[75] Inventors: Gert Paul Volpp, Princeton; Harry Dounchis, Lawrence Township, both of N.J.

[73] Assignee: FMC Corporation, New York, N.Y.

[22] Filed: June 29, 1971

[21] Appl. No.: 158,117

[52] U.S. Cl..............................260/306.8 D, 71/90
[51] Int. Cl................................................C07d 91/54
[58] Field of Search...........................260/306.8 D

[56] References Cited

UNITED STATES PATENTS 2,827,457   3/1958   Slack et al....................260/306.8 D Primary Examiner—Donald G. Daus
Assistant Examiner—R. J. Gallagher
Attorney—Henry R. Ertelt et al.

[57] ABSTRACT

A new chemical compound, of the formula N-(4-cyano-1,2,3-thiadiazol-5-yl)propionamide, has selective pre-emergence and post-emergence herbicidal activity. The synthesis of this compound is described, and its utility is exemplified.

1 Claim, No Drawings

N-(4-CYANO-1,2,3-THIADIZOL-5-YL) PROPIONAMIDE

BACKGROUND OF THE INVENTION

1. Field of the Invention

This invention pertains to the general field of herbicides, and particularly to compositions which selectively control plant growth.

Description of the Prior Art

There is a substantial need for herbicides with selectivity in both pre- and post-emergence applications. It is known that certain substituted 1,2,4- and 1,3,4-thiadiazole derivatives exhibit herbicidal activity of varying types. However, the plant responses in selective pre-emergence and post-emergence herbicidal activity of the compound of the present invention have not previously been reported or suggested in the art.

SUMMARY OF THE INVENTION

This invention pertains to a novel herbicidal compound, to new herbicidal compositions, and to a new method for the selective control of undesired plant growth in both pre-emergence and post-emergence treatment.

DETAILED DESCRIPTION OF THE INVENTION AND THE PREFERRED EMBODIMENT

The new herbicidal compound of this invention is N-(4-cyano-1,2,3-thiadiazol-5-yl)propionamide, of the formula:

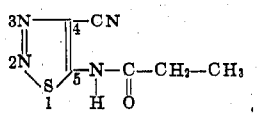

This compound, when formulated as an essential active ingredient of herbicidal compositions, and utilized in either pre-emergence or post-emergence application, has selective herbicidal properties.

The preparation of N-(4-cyano-1,2,3-thiadiazol-5-yl)-propionamide is illustrated below. All temperatures are expressed in degrees centigrade. All parts and percentages are by weight.

EXAMPLE 1 — SYNTHESIS

A solution of 14.8 g of cyanothionoacetamide and 15.0 g of triethylamine in 200 ml of ethanol and 100 ml of chloroform was chilled in an ice-bath to 22°. Keeping the ice-bath in place, 31 g of p-toluenesulfonyl azide was added in small portions. A slightly exothermic reaction was noted. The mixture was stirred for two hours with ice-bath cooling, then for one hour at ambient temperature. The white solid which formed was collected, dissolved in 200 ml of acetonitrile and the solution filtered. The filtrate was concentrated to less than 50 ml and the solid which separated was collected to give 5.4 g of 5-amino-4-cyano-1,2,3-thiadiazole, mp 168°–171°. Infrared and mass spectographic analytical results were consistent with the assigned structure.

Analysis:

Calc'd for $C_3H_2N_4S$: C 28.58; H 1.60; N 44.44
Found: C 28.75; H 1.81; N 44.32

A mixture of 2.53 g of 5-amino-4-cyano-1,2,3-thiadiazole and 2.9 g of propionic anhydride in 15 ml of acetonitrile was heated under reflux for 6 days. The course of reaction was followed by thin-layer chromatographic analysis which showed the reaction to be very slow and incomplete even after 6 days. The mixture was cooled to room temperature and the separated solid isolated to give 1.65 g of white solid N-(4-cyano-1,2,3-thiadiazol-5-yl)propionamide, mp 149°–150°. Recrystallization from benzene, after treatment of the solution with activated charcoal, increased the melting point to 152°–154°. Nuclear magnetic resonance and mass spectra were consistent with the assigned structure.

Analysis:

Calc'd for $C_6H_6N_4OS$: C 39.56; H 3.32; N 30.76
Found: C 39.42; H 3.15; N 30.52

For herbicidal applications, N-(4-cyano-1,2,3-thiadiazol-5-yl)propionamide may be utilized in diverse formulations, including the adjuvants and carriers normally employed to facilitate the dispersion of active ingredients in agricultural applications, recognizing the fact that the formulation and mode of application of a toxicant may affect the activity of the material in a given application. Thus, the compound of this invention may be formulated as a granule of relatively large particle size, as a wettable powder, as an emulsifiable concentrate, as a solution, or as any of several other known types of formulations, depending on the desired mode of application.

Granular formulations are particularly useful for aerial distribution or for penetration of a canopy of foliage. Useful granular formulations may be of several types. Impregnated granules are those wherein the active ingredient is applied to large particles of an absorbent carrier, such as an attapulgite or kaolin clay, corncobs, expanded mica, etc., normally in the form of a solution in a solvent. Surface-coated granules may be produced by spraying the molten active ingredient onto the surface of a generally nonabsorbent particle or by spraying on a solution of active ingredient in a solvent. The core may be water-soluble such as a prilled fertilizer, or insoluble such as sand, marble chips or coarse talc. Particularly useful is a granule wherein a wettable powder is applied as a surface coating to a sand or other insoluble particle such that the wettable may be dispersed on contact of the granule with moisture. Granules may be produced by agglomeration of dusts or powders by compaction rollers, by extrusion through a die or by use of a granulating disc. Granular formulations may vary widely in concentration, with useful formulations containing as little as 0.5 percent or as much as 95 percent of active ingredient.

Wettable powders, also useful formulations for both pre- and post-emergence herbicides, are in the form of finely divided particles which disperse readily in water or other dispersants. The wettable powder is ultimately applied to the soil either as a dry dust or as an emulsion in water or other liquid. Typical carriers for wettable powders include fuller's earth, kaolin clays, silicas and other highly absorbent, readily wet inorganic diluents. Wettable powders normally are prepared to contain about 5 to 80 percent of active ingredient, depending on the absorbency of the carrier, and usually also contain a small amount of a wetting, dispersing or emulsifying agent to facilitate dispersion. For example, a useful wettable powder formulation contains 80.8 parts of N-(4-cyano-1,2,3-thiadiazol-5-yl)-propionamide, 17.9 parts of palmetto clay, and 1.0 part of sodium lignosulfonate and 0.3 part of sulfonated aliphatic polyester as wetting agents.

Other useful formulations for herbicidal applications are the emulsifiable concentrates, which are homogeneous liquid or paste compositions dispersible in water or other dispersant, and may consist entirely of the compound of this invention with a liquid or solid emulsifying agent, or may also contain a liquid carrier, such as xylene, heavy aromatic naphthas, isophorone and other nonvolatile organic solvents.

Typical wetting, dispersing or emulsifying agents used in agricultural formulations include, for example, the alkyl and alkylaryl sulfonates and sulfates and their sodium salts; polyethylene oxides; sulfonated oils, fatty acid esters of polyhydric alcohols; and other types of surface-active agents, many of which are available in commerce. The surface-active agent, when used, normally comprises from 1 to 15 percent by weight of the herbicidal composition.

Other useful formulations for herbicidal applications include simple solutions of the active ingredient in a dispersant in which it is completely soluble at the desired concentration, such as acetone or other organic solvents. These formulations may be applied without further dilution or as dilute solutions, emulsions or suspensions in water or other suitable diluent. The compositions may be applied to the area wherein control is desired by spraying onto the undesired vegetation or onto the surface of the soil in the case of liquid compositions or by distribution from mechanical equipment in the case of solids. The surface-applied material may also be blended into the upper layer of soil by cultivation, or left as applied, as is appropriate to gain the optimum results with the particular treatment.

The selective pre-emergence and post-emergence herbicidal activity of N-(4-cyano-1,2,3-thiadiazol-5-yl)propionamide is illustrated in the following example:

EXAMPLE 2 — SELECTIVE HERBICIDAL ACTIVITY

Pre-emergence herbicidal activity of N-(4-cyano-1,2,3-thiadiazol-5-yl)propionamide was demonstrated as follows: Test crop seeds were planted in 8 ×6 ×3 inches flat-bed trays containing 2 to 3 inches of sandy-loam soil. Within 24 hours after planting, the surface of the soil was sprayed with an aqueous-acetone (1:1) solution of the N-(4-cyano-1,2,3-thiadiazol-5-yl)-propionamide at a rate equivalent to 80 gallons per acre (1,500 ppm solution giving the 1 pound/acre rate). The trays were maintained in the greenhouse and watered regularly for 17 days, after which time the phytotoxicity of the propionamide was assessed. Individual plant species were examined for percent kill in comparison with an untreated planting, and results are presented in Table 1.

Post-emergence herbicidal activity was demonstrated as follows: Test crop seeds were planted in 8 ×6 ×3 inches shallow flatbed trays containing 2 to 3 inches of a loam soil. The growth trays were maintained in the greenhouse and watered regularly for approximately 2 weeks. When the first trifoliate leaves of bean plants were unfolding, the test plants were removed from the greenhouse and sprayed as the soil was in the pre-emergence test above. The treated plants and untreated controls were maintained in the greenhouse and watered regularly for an additional seventeen days, after which time the phytotoxicity of the propionamide was assessed. Individual plant species were examined for percent kill, and results are presented in Table 1.

TABLE 1 — SELECTIVE HERBICIDAL ACTIVITY

| Test Plant Species | Percent Kill | | | | | |
|---|---|---|---|---|---|---|
| | Pre-emergence | | | Post-emergence | | |
| | 1 lb/A | 2 lb/A | 4 lb/A | 1 lb/A | 2 lb/A | 4 lb/A |
| Lima Beans | 0 | 0 | 0 | 0 | 0 | 100 |
| Corn | 0 | 0 | 0 | 0 | 0 | 0 |
| Lettuce | 0 | 30 | 30 | 90 | 100 | 100 |
| Mustard | 60 | 30 | 60 | 100 | 100 | 100 |
| Crabgrass | 0 | 0 | 0 | 0 | 0 | 100 |

The herbicidal activity in pre-emergence treatment is seen to be moderate at these low dosages, but the selectivity and potency in post-emergence applications are outstanding.

The active herbicidal compound of this invention may be formulated and/or applied with insecticides, fungicides, nematocides, plant-growth regulators, fertilizers, and other agricultural chemicals. In applying the active compound of this invention, whether formulated alone or with other agricultural chemicals, an effective amount and concentration of N-(4-cyano-1,2,3-thiadiazol-5-yl)propionamide are of course employed.

It is apparent that various modifications may be made in the formulation and application of the novel compound of this invention, without departing from the inventive concept herein, as defined in the following claims.

We claim:

1. N-(4-cyano-1,2,3-thiadiazol-5-yl)propionamide.

* * * * *